United States Patent [19]

Crane et al.

[11] Patent Number: 4,864,583
[45] Date of Patent: Sep. 5, 1989

[54] GAS LASERS WITH REDUCED TURN-ON DELAY

[75] Inventors: Dale E. Crane, Santa Clara; Yi Qin, Manteca, both of Calif.

[73] Assignee: Uniphase Corporation, San Jose, Calif.

[21] Appl. No.: 181,438

[22] Filed: Apr. 14, 1988

[51] Int. Cl.$^4$ .................................................. H01S 3/03
[52] U.S. Cl. ...................................... 372/61; 372/29; 372/33
[58] Field of Search .......................... 372/29, 33, 55, 61

[56] References Cited

U.S. PATENT DOCUMENTS

| | | | |
|---|---|---|---|
| 3,792,372 | 2/1974 | Mark | 372/61 |
| 4,190,810 | 2/1980 | Bayley | 372/61 |
| 4,352,185 | 9/1982 | Crane | 372/29 |
| 4,387,462 | 6/1983 | Markus | 372/33 |
| 4,631,727 | 12/1986 | Crane et al. | 372/33 |
| 4,750,182 | 6/1988 | Crane et al. | 372/33 |

Primary Examiner—William L. Sikes
Assistant Examiner—B. R. R. Holloway
Attorney, Agent, or Firm—Stanger, Michaelson, Reynolds, Spivak & Tobia

[57] ABSTRACT

The turn-on delay of a gas laser is significantly reduced by creating a region of higher electric field intensity between the plasma discharge-confining region of the laser and the laser anode. This is accomplished by creating one or more regions of higher conductivity along the surfaces of the laser tube structure. In one embodiment, a conductive strip is placed upon the surface of the capillary tube containing the plasma discharge. In other embodiments, a second electrode for concentrating the electric field in the preferred region of the tube is included.

6 Claims, 2 Drawing Sheets

GAS LASERS WITH REDUCED TURN-ON DELAY

TECHNICAL FIELD

This invention relates to cold cathode gas tubes, such as gas lasers, and, in particular, to arrangements for reducing the turn-on delay in such devices.

BACKGROUND OF THE INVENTION

The breakdown of a gas in a cold cathode gas tube, to form a gas discharge, is primarily a statistical process depending upon the intensity of pre-ionization events and little understood differences among tubes that are ostensibly identical. If no measures are taken in the design of such tubes, turn-on delay times of many seconds are typically obtained under adverse conditions of low ambient light and low temperatures.

Various techniques have been proposed to reduce turn-on delay. See, for example, U.S. Pat. Nos. 3,792,372; 4,190,810; and 4,352,185. These are discussed at some length in U.S. Pat. No. 4,631,727 and application Ser. No. 870,794, filed 6/5/86 and allowed 1/20/88, both assigned to applicants' assignee. As indicated in these discussions, while such prior art arrangements may reduce starting time, they have a number of serious disadvantages. The first disadvantage is that they significantly increase the anode-to-ground capacitance, thereby greatly increasing the likelihood of producing parasitic relaxation oscillations. A second disadvantage has to do with cost. All these techniques tend to complicate the tube structure and add significantly to the cost.

Recently, the need for helium-neon lasers with consistently low turn-on times has led to considerable research directed at this problem. The results of this research have disclosed that micro discharges are created in such lasers outside of the preferred region of the laser, and that these micro discharges actually inhibit ignition. Accordingly, in U.S. Pat. No. 4,631,727, an electric field concentrator is incorporated into the tube design. The concentrator is located at the anode end of the tube, producing a region of high electric field intensity, thereby increasing the probability of breakdown occurring in this preferred region of the tube. This resulted in a considerable improvement in starting reliability. Typically, starting times of 150 milliseconds were realized. The maximum starting time observed was one second.

Although this proved adequate for many applications, new applications have emerged that require absolute maximum turn-on times of 0.5 second. Continuing research revealed a new variable that had previously gone undetected. The new variable is related to surface impedance variations in the glass which is a function of surface contamination effects. This discovery led to the arrangement disclosed in the above-identified application Ser. No. 890,794 wherein a coupler was added to dominate the impedance due to such contaminants.

The combination of the above-described field concentrator and the above-described coupler enabled the 0.5 second maximum starting time to be achieved with typical starting times of under 100 milliseconds. However, more recently demands upon performance have again increased. This is so in certain high-speed inspection systems where maximum turn-on times of no greater than 100 milliseconds, and average turn-on times of 50 milliseconds are needed.

It is, accordingly, the broad object of the present invention to reduce the starting time of gas lasers.

SUMMARY OF THE INVENTION

The typical gas laser includes a small bore capillary tube whose axis extends between the cavity mirrors and within which the gas discharge is made to occur. At the anode end of the bore, the tube is suspended by means of a glass septum which extends from the bore to the tube envelope.

In accordance with the present invention consistently short starting delays can be realized by increasing the surface conductivity along a portion of the capillary tube. In a first embodiment of the invention, a conductive strip is placed along the surface of the capillary tube adjacent to the supporting septum. As will be explained in greater detail herein below, the effect of placing a conductive strip in this location is to create a localized region of high electric field intensity directly adjacent to the anode. This serves to produce ionization particles in the preferred region of the laser tube resulting in rapid turn-on.

In a second embodiment of the invention, a conductive strip, as in the first embodiment, is employed in conjunction with a field intensifier of the type described in the above-identified U.S. Pat. No. 4,631,727. In a third embodiment, the conductive strip along the capillary tube is employed in conjunction with a second conductive strip placed along the supporting septum.

It is a feature of the invention that there is no need to make conductive connections to either of the two strips. As a consequence the invention can be readily incorporated into laser tubes with very little change in existing manufacturing processes.

DETAILED DESCRIPTION

Figure 1:
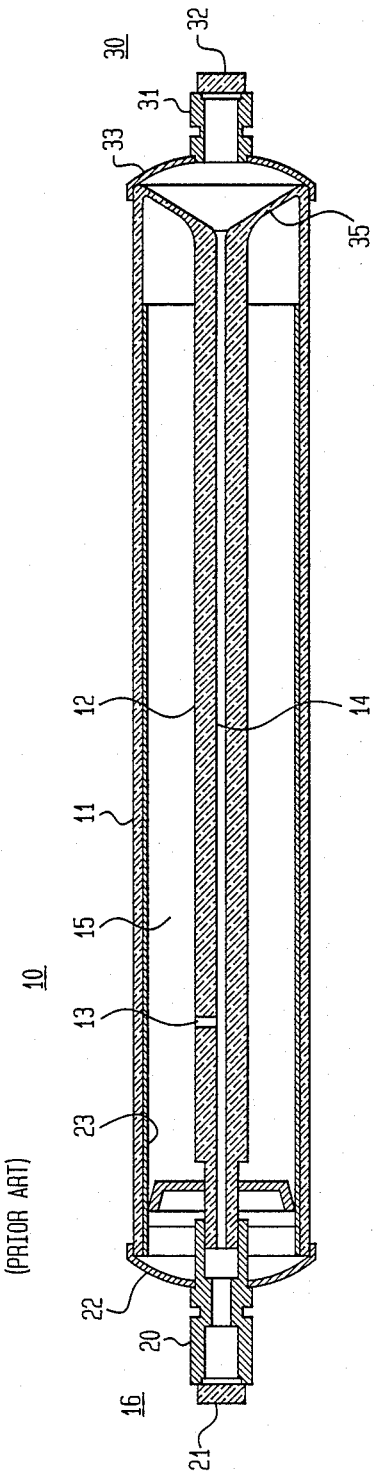
FIG. 1 shows a longitudinal cross-section of a typical prior art gas laser.

Referring to the drawings, FIG. 1 shows a longitudinal cross section of a typical prior art gas laser 10. In general, such devices comprise an outer glass envelope 11, and an inner, coaxially aligned capillary tube 12 which serves as the plasmadischarge confining region of the laser. A cross bore 13, extending through the wall of tube 12, connects the space between tubes 11 and 12 with the bore region 14 within tube 12. A cathode end cap assembly 16 is located at the left end of laser 10. This includes a hollow conductive member 20, at one end of which one of the cavity-defining mirrors 21 is mounted. The other end of member 20 is adapted to receive and support one end of capillary tube 12. The assembly is sealed to the adjacent end of tube 11 by means of an end cap 22. . Also extending along the inside wall of laser tube 11 is an electrically and thermally conductive cathode liner 23. The latter, which extends along most of the length of tube 11, serves to maintain a uniform temperature along the laser tube.

Similarly disposed at the right end of the laser is the anode assembly 30 comprising a hollow, electrically conductive member 31, at one end of which a second cavity-defining mirror 32 is located. At this end, capillary tube 12 is supported by means of glass septum 35 which extends from tube 11 to tube 12 at about a 60 degree angle to the tube axis. A domed end cap 33 secures the anode assembly to the laser tube.

Figure 2:
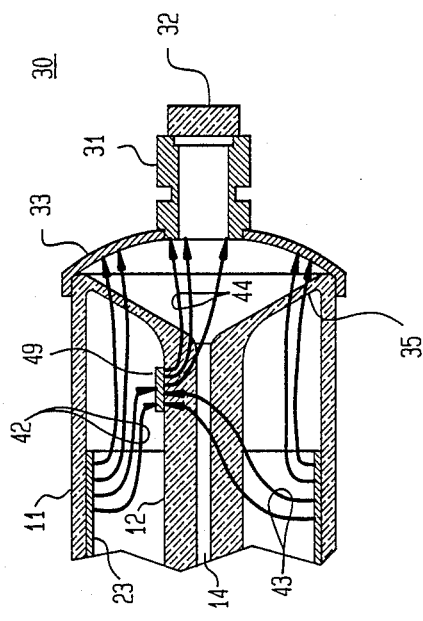
FIG. 2 shows the anode end of the laser of FIG. 1 and the electric field distribution in the region of the laser bore.

FIG. 2 shows a portion of the tube illustrated in FIG. 1. In particular, included in the figures is the anode assembly 30 and the adjacent ends of envelope 11, capillary tube 12, cathode sleeve 23 and septum 35. Also shown is the starting electric field distribution in such a gas laser prior to ignition. Lacking any sort of field concentrators, the electric field, as illustrated by the field lines 40 and 41, tends to be concentrated at the outer envelope, extending between the anode and the edge of the cathode sleeve 23. It should be noted that while this representation is only approximate in that it ignores the conductivity of the glass surface, it is sufficiently accurate to illustrate the problem. The preferred field distribution would have the maximum field intensity in the region of the bore 14 along which the discharge is to take place. Instead, the actual field distribution gives rise to microdischarges which occur outside the bore region. These, in turn, produce charging of the surface of the glass septum 35 which effectively reduces the magnitude of the net electric field at the bore below that required for rapid breakdown.

Figure 3:
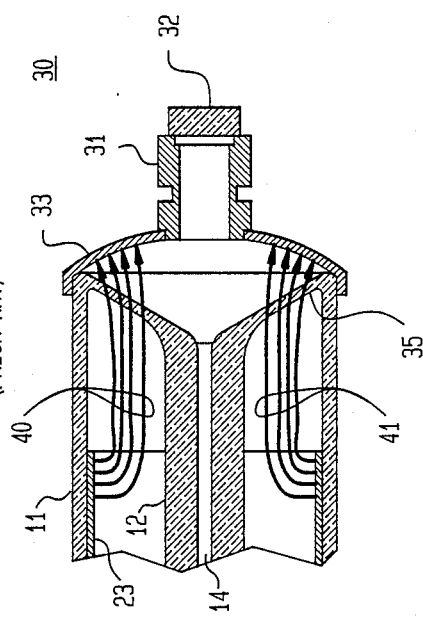
FIG. 3 shows a first embodiment of the invention including a conductive strip disposed along the laser capillary tube.

To avoid this, it has been discovered that the field distribution can be advantageously modified by increasing the surface conductivity of the glass in the region of the bore. This is illustrated in a first embodiment of the invention shown in FIG. 3. In this embodiment, the laser has been modified so as to include a conductive strip 49 on the outside surface of the capillary tube 12 adjacent to the glass septum 35. The effect of placing a conductive strip in the region between the cathode sleeve 23 and the anode assembly 30 is to intercept some of the electric field, as represented by field lines 42 and 43, that would normally extend directly between the cathode sleeve and the anode, as illustrated in FIG. 2. As can be seen, the net effect is to concentrate more of the available electric field in the region of the bore, as illustrated by field lines 44. This significantly enhances the probability that a discharge will be induced in the region of the bore.

Gas lasers employing such a field concentrator have been constructed simply by painting a narrow strip, approximately 1 mm wide and 5 to 10 mm long, of a high temperature bakeable metallic paint, such as silver, on the outside of the capillary glass tube terminating next to the glass septum. Lasers constructed in this manner exhibited extremely reliable starting times averaging hundreds of milliseconds, with maximums of 1 second.

Figure 4:
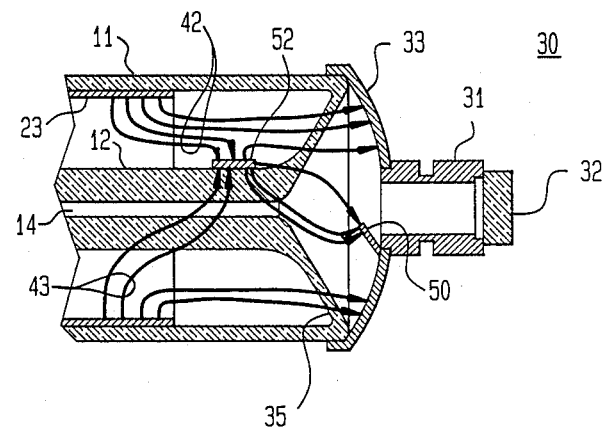
FIGS. 4 and 5 show alternate embodiments of the invention including a second field concentrator along with the strip employed in FIG. 3.

FIG. 4 shows a second embodiment of the invention wherein a conductive strip 52 is employed in conjunction with a field concentrator 50 of the type disclosed in U.S. Pat. No. 4,631,727. The latter comprises a conductive material from which there extends a projecting portion. Because of the field concentrating capabilities of such a field concentrator, more of the electric field is concentrated in the region of the bore, resulting in further improvements in the starting performance of such lasers.

Figure 5:
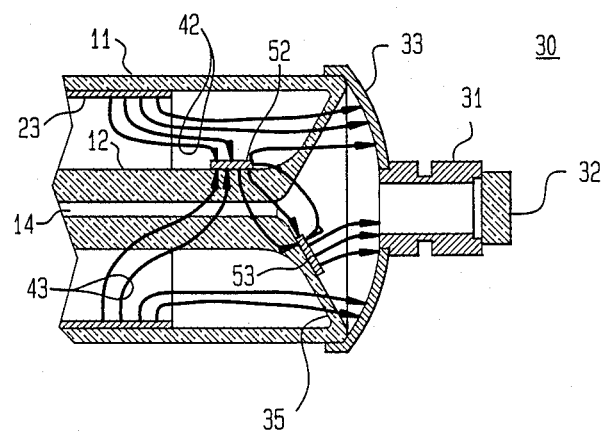

FIG. 5 shows an alternative arrangement of the embodiment of FIG. 4. In this embodiment, the field concentrator 50 is replaced by a second conductive strip 53 disposed along a surface of septum 35. In this configuration, both strips 52 and 53 are conductively insulated from both the laser cathode and anode.

In operation, conductive strip 52 intercepts some of the electric field lines that would normally extend directly between the cathode and anode. Similarly, some of the electric field in the region between strip 52 and the anode is intercepted by the second strip 53 on septum 35. The net effect is to increase the field intensity across the end of the capillary tube where it is best situated to induce ionization in the bore region. Lasers incorporating field concentrators of the type disclosed in either FIGS. 4 or 5 produced starting times averaging 15 milliseconds and maximums of 100 milliseconds.

It will be recognized that the arrangements of strips shown are merely illustrative of the many variety of field concentrator configurations that can be devised to increase the electric field intensity in the region of the bore. While conductive strips have been described as being painted onto the glass capillary tube, it will be recognized that the desired high conductivity can be realized by modifying the surface conductivity of the glass itself by the appropriate addition of materials to the capillary tube during its fabrication. Thus, it will be understood that various other embodiments, having other conductivity modifiers, can be fashioned by those skilled in the art in accordance with the teachings of the invention.

What is claimed is:

1. A gas laser comprising:
    a hermetically sealed, elongated envelope enclosing a gaseous medium capable of supporting stimulated emission of radiation in response to an electric field impressed across said gaseous medium;
    means, including an anode and a cathode, for producing an electric field within said tube when externally energized;
    and a discharge confining, conductively-insulating capillary tube having a low surface conductivity and a bore extending between said anode and cathode;

CHARACTERIZED IN THAT:
    said capillary tube includes a region of higher surface conductivity at the end thereof adjacent to said anode.

2. The laser according to claim 1 wherein said capillary tube is supported at its end adjacent to said anode by means of a conductively insulating septum having a low surface conductivity;
    and wherein said septum includes a region of higher surface conductivity.

3. The laser according to claim 1 wherein said region of higher surface conductivity along said capillary tube comprises a conductive strip.

4. The laser according to claim 2 wherein said region of higher conductivity on said septum comprises a conductive strip.

5. The laser according to claim 2 wherein said capillary tube and said septum are both made of glass.

6. The laser according to claim 1 including a field concentrator conductively connected to said anode for locally increasing the electric field intensity in the region adjacent to said anode.

* * * * *